United States Patent [19]

Dickinson

[11] Patent Number: 4,964,650
[45] Date of Patent: Oct. 23, 1990

[54] PLASTIC X-FRAME CART

[75] Inventor: Thomas Dickinson, St. Louis, Mo.

[73] Assignee: Contico International Inc., St. Louis, Mo.

[21] Appl. No.: 240,676

[22] Filed: Sep. 6, 1988

[51] Int. Cl.⁵ ............................................. B62B 3/02
[52] U.S. Cl. .................. 280/641; 280/651; 280/659; 280/47.34
[58] Field of Search ................ 280/639, 38, 641, 644, 280/651, 654, 649, 47.34, 42, 20, 659; 403/161, 162, 163

[56] References Cited

U.S. PATENT DOCUMENTS

| | | | |
|---|---|---|---|
| 2,967,716 | 1/1961 | Murcott | 280/641 |
| 3,106,409 | 10/1963 | Berlin | 280/47.34 |
| 3,633,932 | 1/1972 | Holden | 280/641 |
| 3,967,803 | 7/1976 | Kienlen et al. | 403/163 X |
| 4,488,650 | 12/1984 | Licari | 403/163 X |
| 4,549,748 | 10/1985 | Haley, Sr. | 280/641 |

FOREIGN PATENT DOCUMENTS

| | | | |
|---|---|---|---|
| 166959 | 7/1921 | United Kingdom | 403/161 |
| 2180199 | 3/1987 | United Kingdom | 280/651 |

OTHER PUBLICATIONS

Continental Manufacturing Catalogue sheet p. 18, pre 1988 catalogue.
1985 Rubbermaid X Frame Catalogue Sheet.
Cleaning Management pp.28–34, article on Rubbermaid X-Frame.

Primary Examiner—Charles A. Marmor
Assistant Examiner—Tamara L. Finlay
Attorney, Agent, or Firm—Sandler, Greenblum & Bernstein

[57] ABSTRACT

A plastic janitorial x-frame cart which is stable when in the closed position. The cart contains a circular rotator which allows the unit to take advantage of the symmetry of legs. Further the unit contains a bottom tray with elevated ends.

9 Claims, 7 Drawing Sheets

PLASTIC X-FRAME CART

BACKGROUND OF THE INVENTION

I. Field of the Invention

The invention relates generally to the field of janitorial and maintenance equipment. In particular the invention relates to x-frame carts.

II. Description of the Prior Art

X-frame carts have been used in janitorial and maintenance uses for many years. They have traditionally been manufactured from 1 inch metal tubing. A pin is inserted at the point where the metal tubes cross to form a pivot point on the cart. This allows the cart to be folded for storage.

Currently there is being marketed a plastic cart which is being classified as an x-frame cart. However, due to a number of deficiencies it does not provide the user with all of the advantages of the traditional metal x-frame cart. For instance, the cart does not fold symmetrically. Also, due to the requirements of plastic an oversized handle was required which is difficult to grasp and cannot be used as a cart hanger. Further, the bag rests on plastic hooks which are subject to potential breakage.

The present invention is advantageous for a number of reasons. First, when folded the cart forms a symmetrical unit which provides stability and a more desirable appearance. Second, the pivot rotator resists flexing and distributes stress evenly to the legs. Third, the cart incorporates a specific handle means for maneuvering and for hanging the cart. Fourth, the interlocking bottom floor also evenly distributes stress. And fifth, the raised ends of the bottom floor both reinforces the frame and facilitates the use of the cart.

SUMMARY OF THE INVENTION

Figure 1:
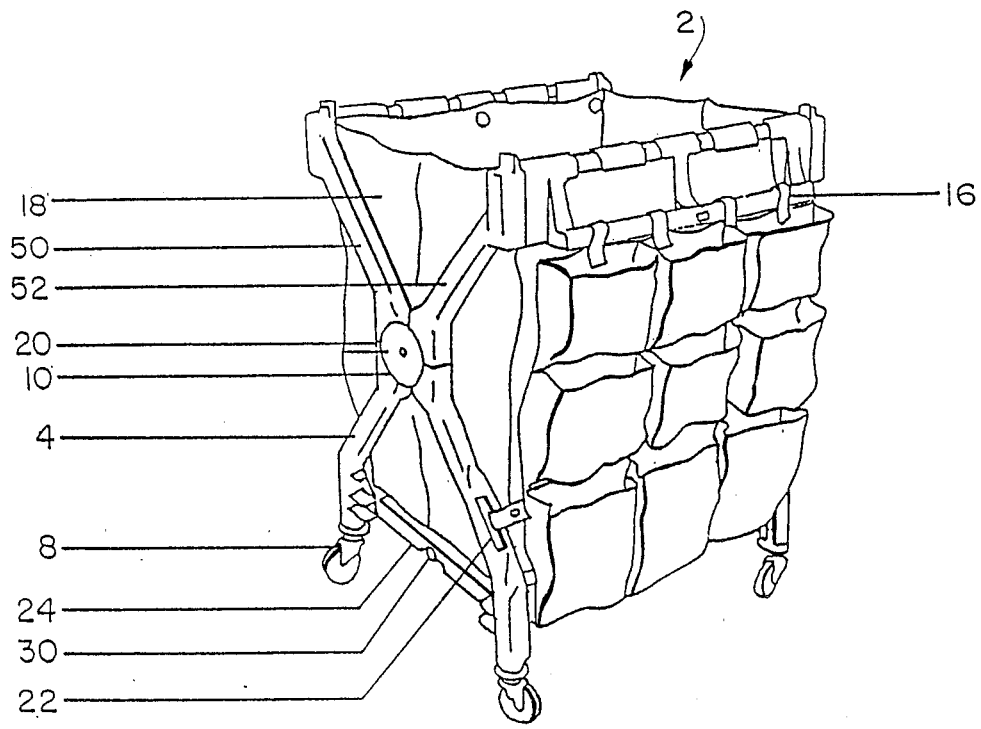
FIG. 1 is a perspective view of the invention with bags.

A plastic x-frame maintenance and janitorial cart which is symmetrical when in a closed position. The cart is characterized by having a circular rotator.

DESCRIPTION OF THE PREFERRED EMBODIMENTS

The cart 2 as shown in the drawings has two sets of legs 4 and 6. The legs terminate with casters 8 and each pair of legs are connected at rotator 10 (see FIGS. 10-13). Across the top of the cart are horizontal bag support members 12. Extending from the horizontal support members 12 by elements 36 are handles 14 which facilitate pushing of the cart 2. The horizontal support member 12 contains hooks for hanging the bag 18 and tools. Auxiliary bags 16 may also be hung from the handles 14. Also, the handles 14 may be used to suspend the cart 2 when in storage.

Figure 3:
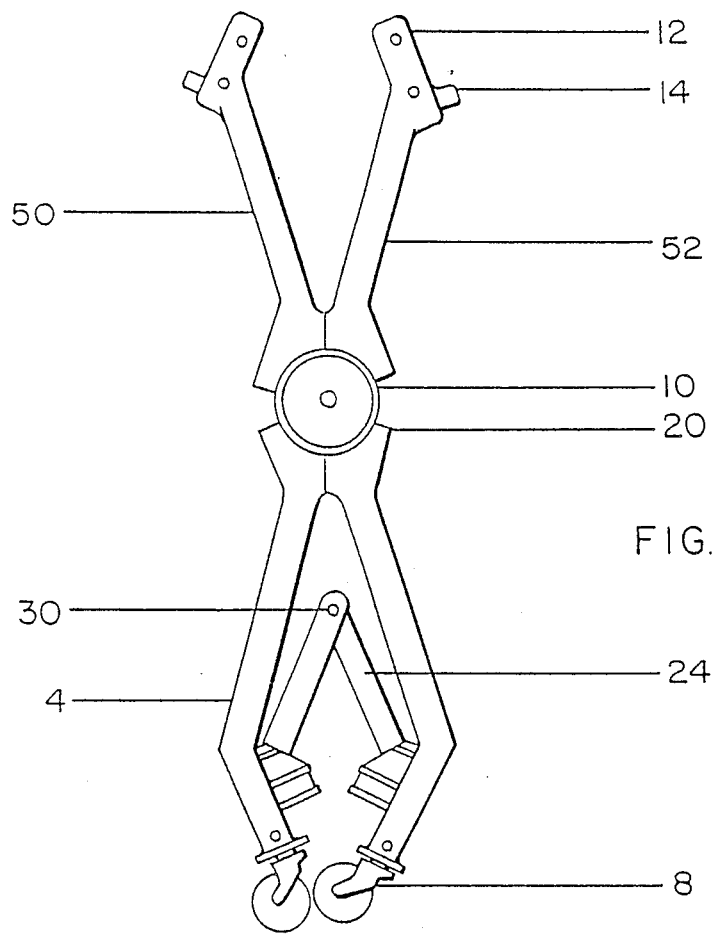
FIG. 3 illustrates the symmetrical folding of the cart.
Figure 4:
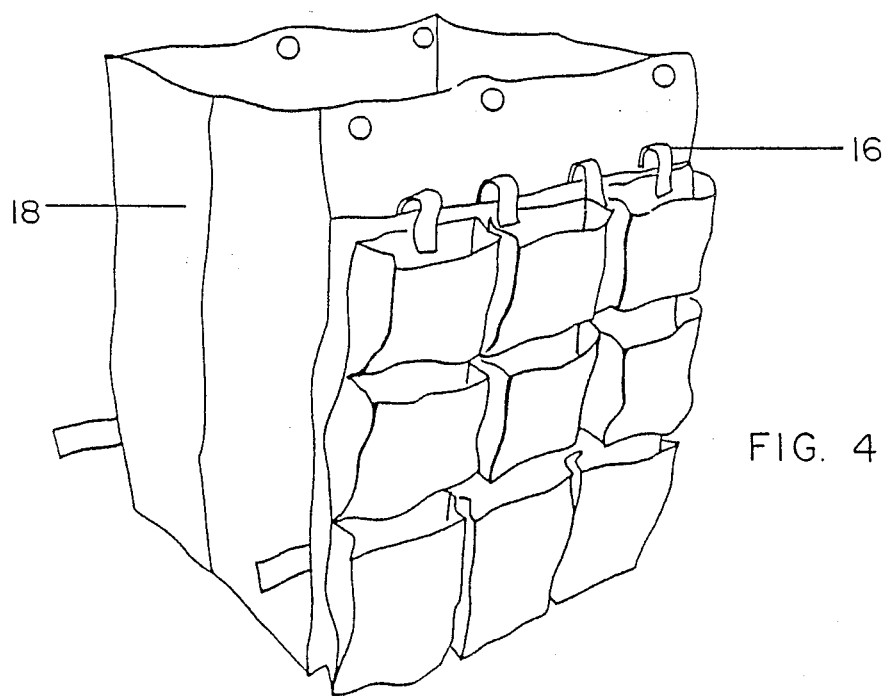
FIG. 4 illustrates the bags employed with the frame of the invention.
Figure 5:
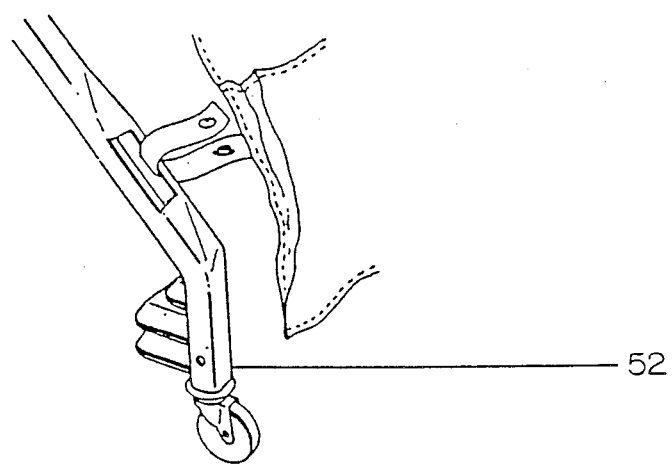
FIG. 5 illustrates the attachment of the utility bag to the leg of the frame.
Figure 6:
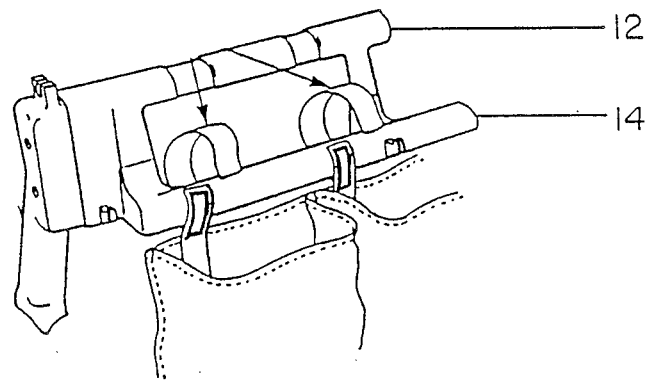
FIG. 6 illustrates the attachment of the utility bag to the handle.
Figure 7:
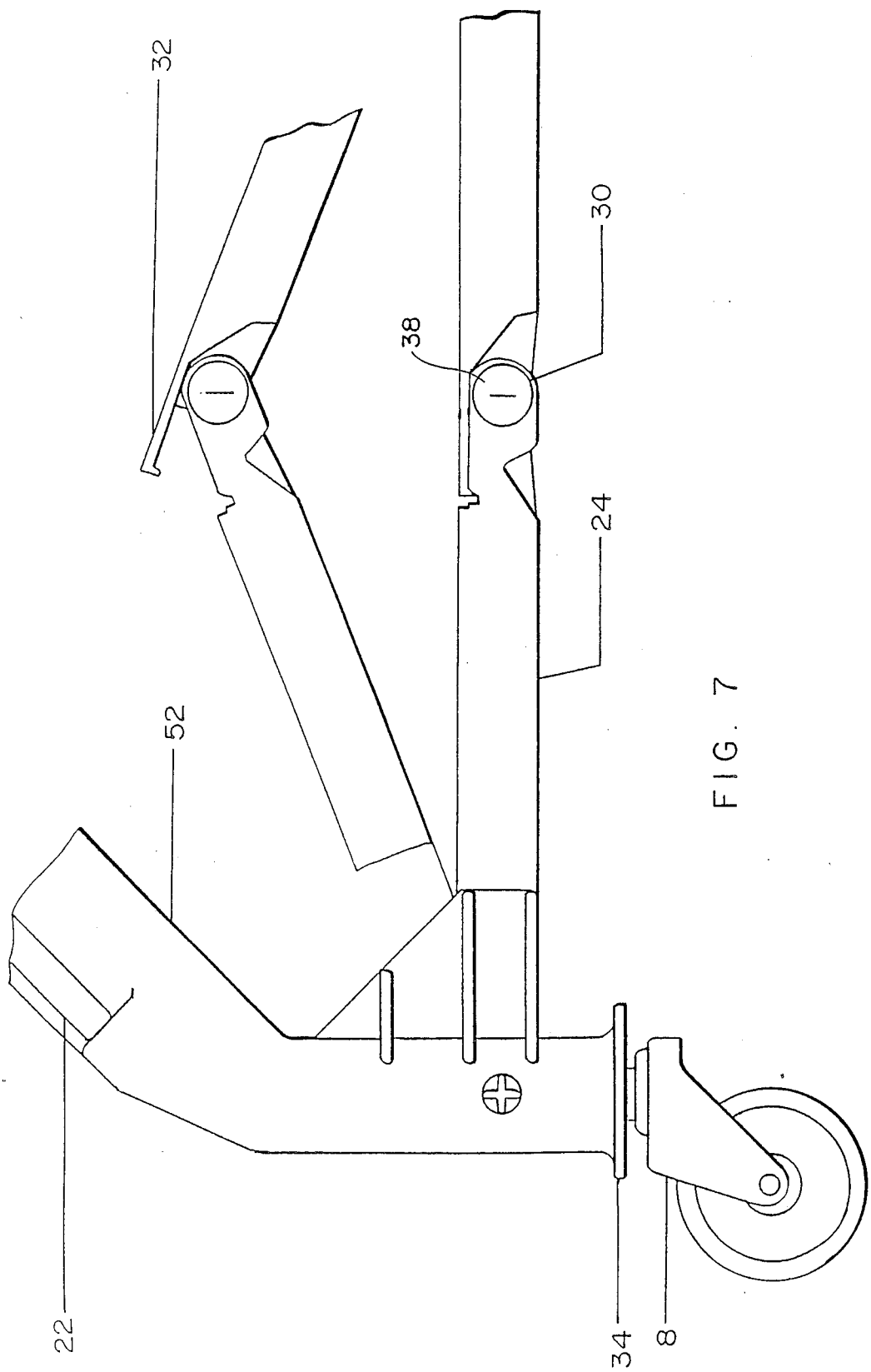
FIG. 7 is a side quarter view illustrating the folding action of the bottom tray.
Figures 8, 9:
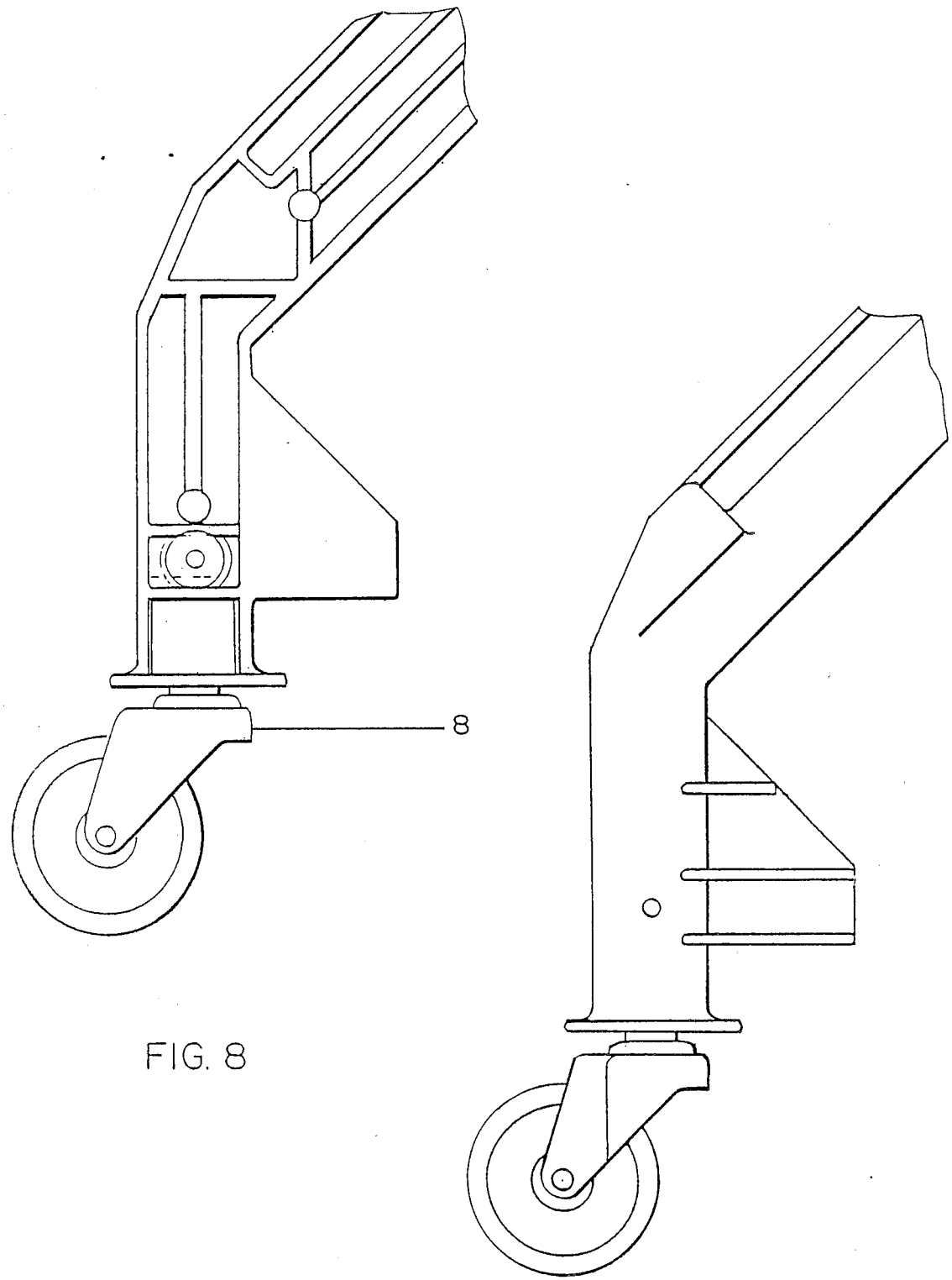
FIG. 8 is an inside side view of the leg bottom.
FIG. 9 is an outside side view of the leg bottom.
Figure 10:
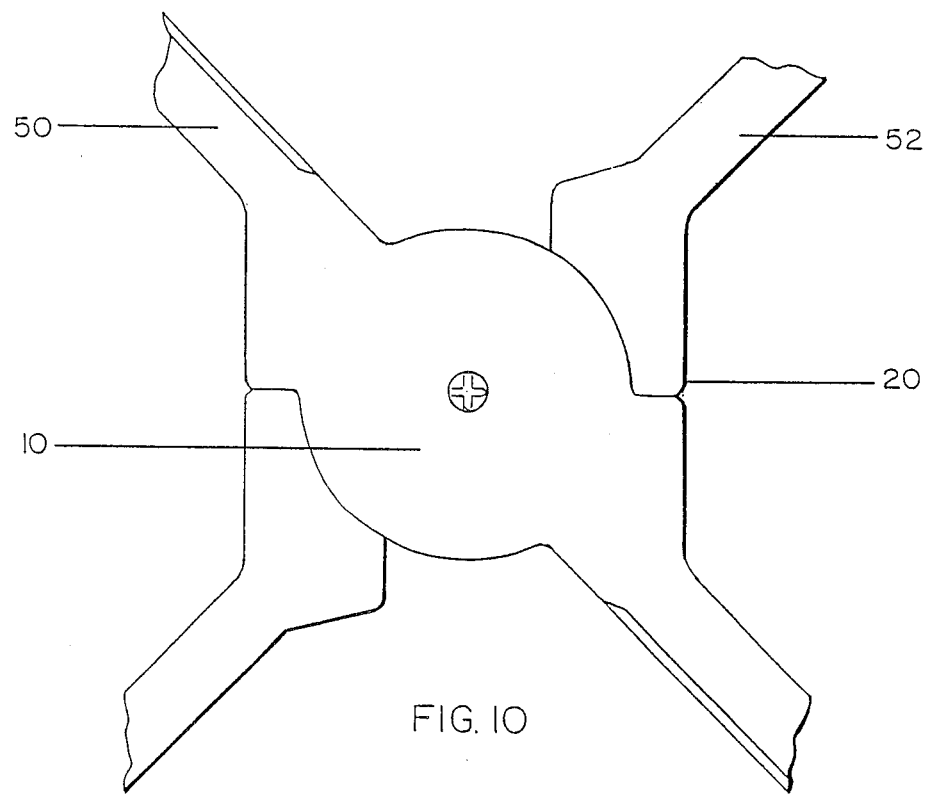
FIG. 10 is an outside view of the rotator.
Figure 11:
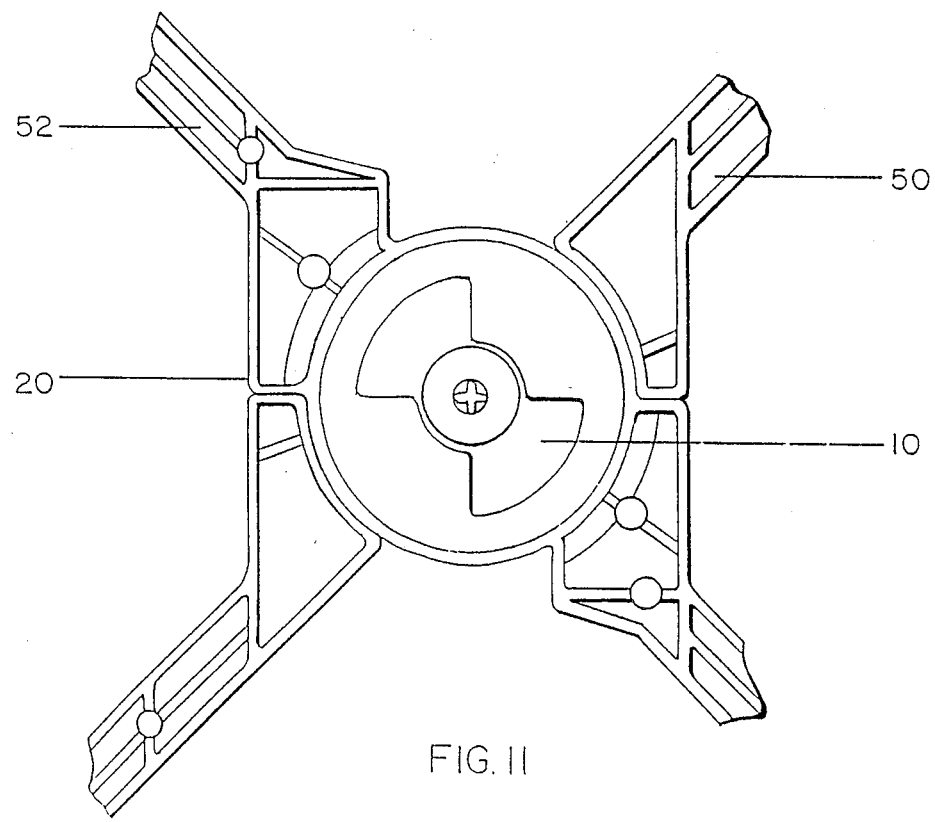
FIG. 11 is an inside view of the rotator.
Figure 12:
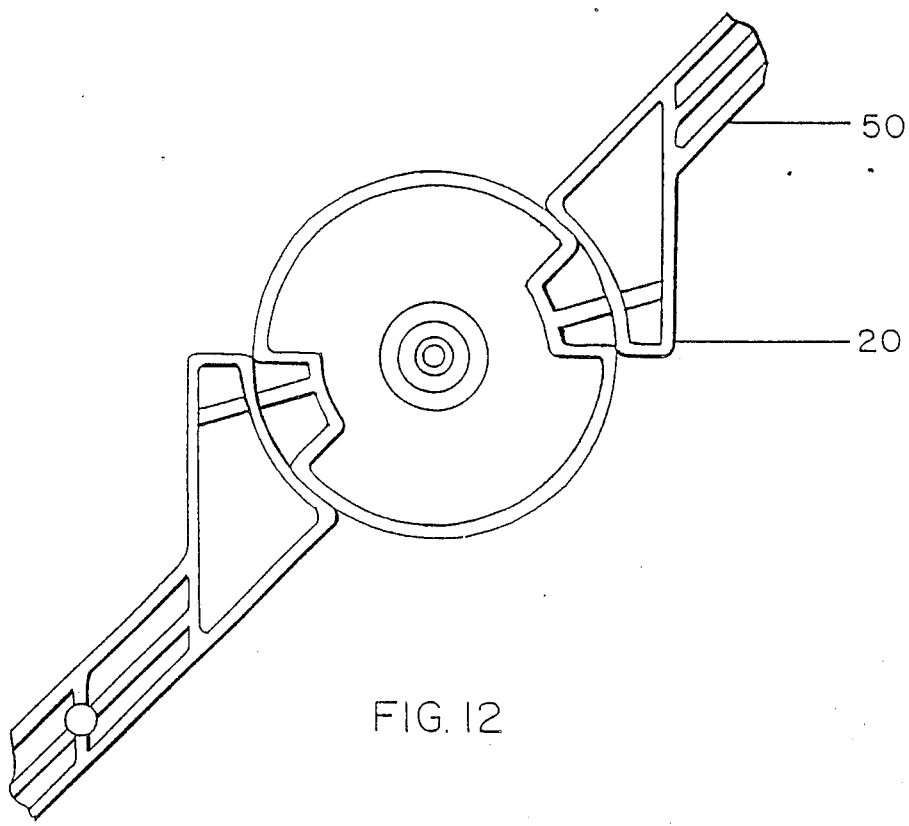
FIG. 12 is an inside view of the outside rotator member.
Figure 13:
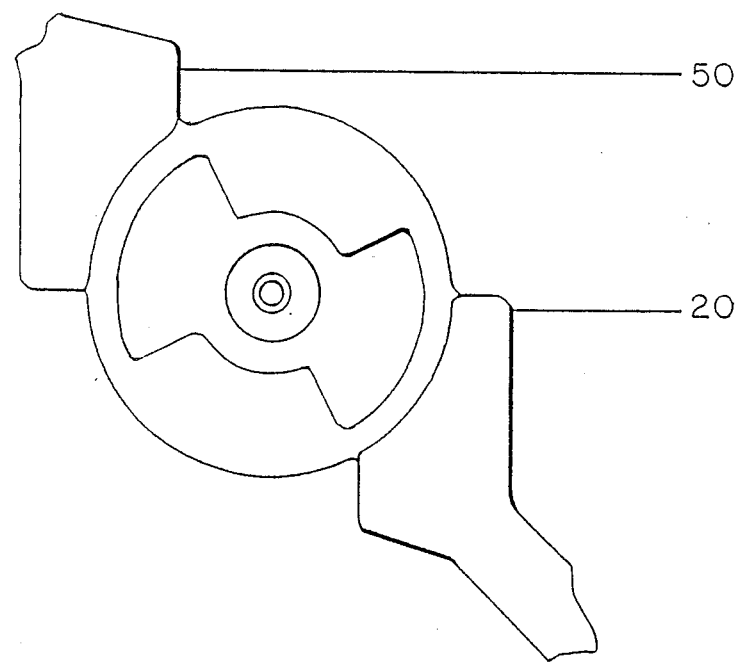
FIG. 13 is an inside view of the inside rotator member.

As illustrated in FIG. 3 the rotator 10 is circular in shape. This shape is advantageous since it diffuses the stress and transfers it down the legs. It should be noted that the two leg components 50 and 52 of pairs 4 and 6 form an X shape similar to the legs of the traditional metal cart. This is untrue of the plastic cart of the prior art. The rotator section of each leg component has internal stops 20 which abut to lock the legs in place when the frame is in the open position. The legs include slots 22 for attachment of a utility bag (see FIGS. 1 and 5).

Figure 2:
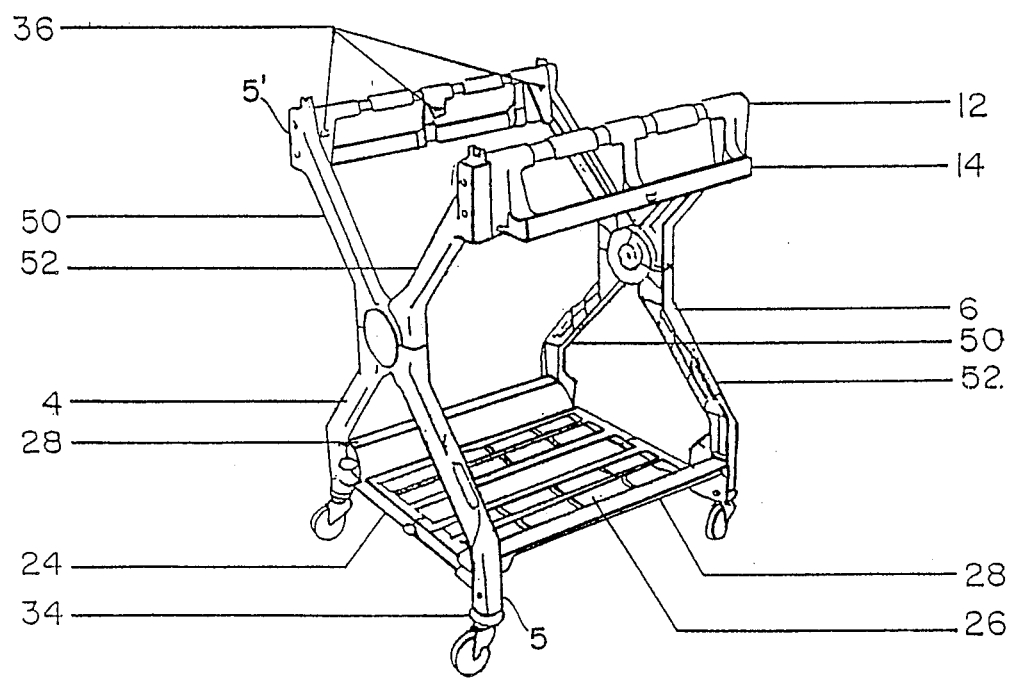
FIG. 2 is a perspective view of the invention without bags.

Further, as seen in FIG. 2, each leg 50 and 52 includes end sections, with each end section having a portion 5, 5' that extends in a substantially vertical orientation when the cart is in the open operative position.

Attached to the legs are bumpers 34 and a bottom tray 24. The tray contains openings 26 to allow the draining of spilled liquids and to strengthen the tray. The tray has an elevated edge 28 directly below the handles 14 which are raised approximately 3 inches. The raised ends serve two functions. First, they act as buttresses to strengthen the cart legs. Second, they allow a user to walk behind the cart without their legs continually bumping into the bottom tray 24.

The bottom tray 24 along its center has an interlocking hinge 30. The hinge 30 is in four sections. Each section has a pair of lips 32 which lock together when the tray is in a horizontal position. Passing through the sections is a metal rod 38 which provides a pivot point and strength to the hinge mechanism.

The cart 2 is preferably made from polypropolene using the structural foam process. The leg components 50 and 52 are approximately 1½ inch in diameter. The horizontal support member 12 has a preferred diameter of 1½ inches and the handle 14 has a diameter of 1 inch.

The cart 2 is opened by separating the horizontal support members 12. The rotator stops 20 and the bottom tray hinge 30 lock into place at the point of maximum opening which is approximately 22 inches. To close the cart 2 an upward pressure is applied to the hinge 30, usually with the foot, and the horizontal support members 12 are pushed together.

The cart of the invention is very versatile and can serve many different functions. It is designed to carry a number of different accessories which expand the cart's range of uses. The cart is both sturdy and easily maneuvered and stored. And unlike the plastic cart of the prior art it has not only all of the advantages of the metal x-frame cart but has a number of additional features.

We claim:

1. A plastic X-frame cart comprising:
   (a) first and second pairs of legs, each pair of legs including two legs pivotally connected together at substantially the mid-portion thereof, wherein end sections of each pair of legs that extend from said mid-portion diverge to an open operative position and converge to a folded position;

(b) a rotator element formed with each leg at the mid-portion thereof, the rotator element of each leg of each pair of legs being pivotally connected together, wherein a center line in all planes extending through the end sections and rotator element of each leg is a straight line, each said pair of legs being symmetrical about a vertical line passing through said rotator elements between the legs of said pair of legs;

(c) at least one support member connecting an upper end of at least one leg of said first pair of legs to an upper end of at least one leg of said second pair of legs; and (d) said end sections of each pair of legs include a portion that extends in a substantially vertical orientation when the cart is in the open operative position.

2. The plastic X-frame cart according to claim 1, wherein each rotator element is circular.

3. The plastic X-frame cart according to claim 1, wherein each said pair of legs are symmetrical about said vertical line in both the open operative position and the folded position.

4. The plastic X-frame cart according to claim 1, comprising two support members connecting the upper ends of each leg of said first pair of legs to the corresponding upper ends of each leg of said second pair of legs.

5. The plastic X-frame cart according to claim 1, comprising a handle on said at least one support member.

6. The plastic X-frame cart according to claim 1, and further comprising a folding bottom tray connected to said first and second pairs of legs.

7. The plastic X-frame cart according to claim 1, and further comprising slots on at least one leg for holding a utility bag.

8. The plastic X-frame cart according to claim 1, and further comprising hooks for holding tools.

9. The plastic X-frame cart according to claim 1, wherein each leg of the first and second pairs of legs includes stop means to abut a stop means on the other leg of its respective pair to lock the legs in place when in the open operative position.

* * * * *